Figure 1:
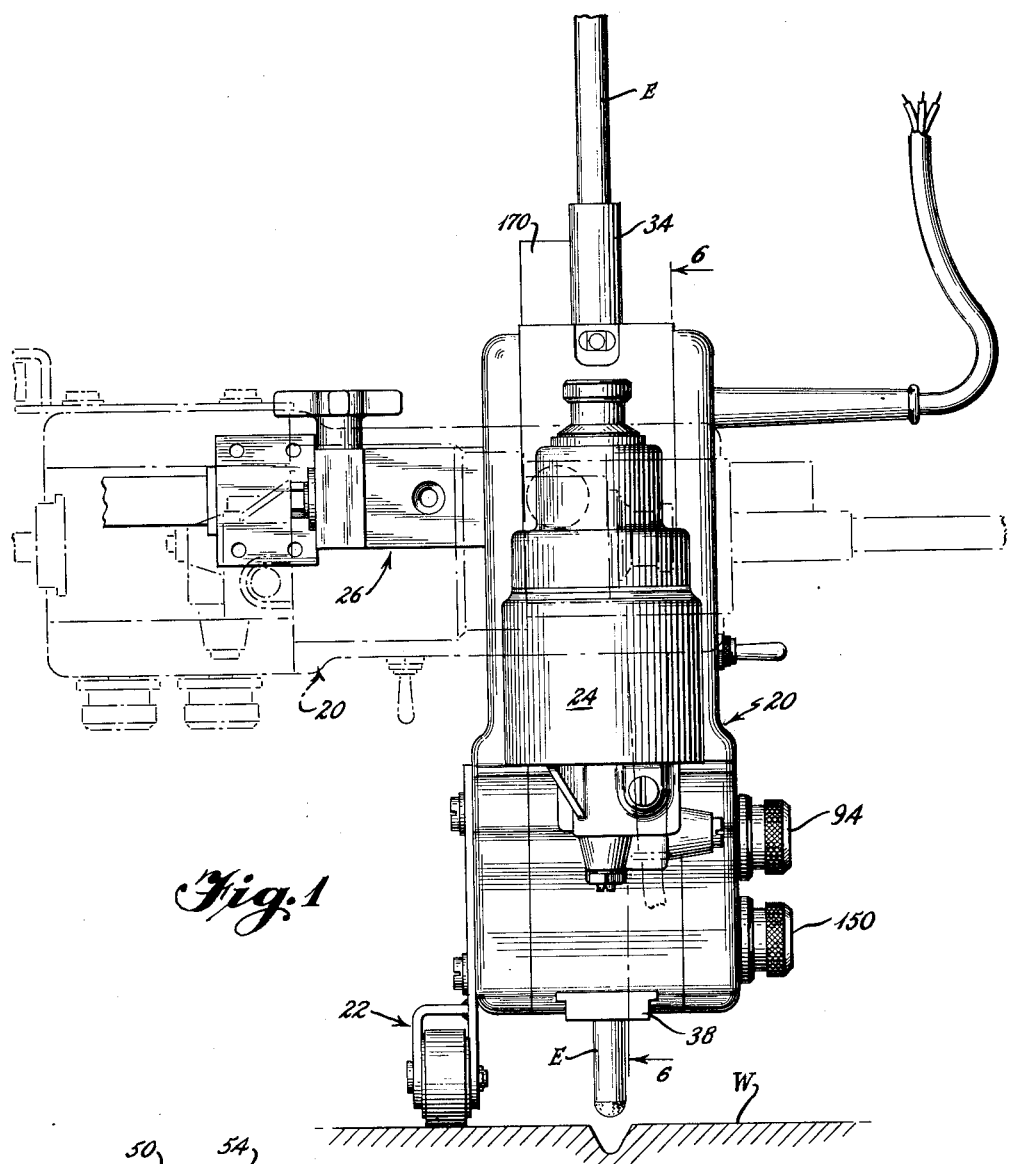

June 20, 1961 M. D. STEPATH 2,989,617
CUTTING AND GOUGING TORCH HEAD
Filed May 11, 1959 5 Sheets-Sheet 1

INVENTOR
Myron D. Stepath

BY
Mead, Browne, Schuyler & Beveridge
ATTORNEYS

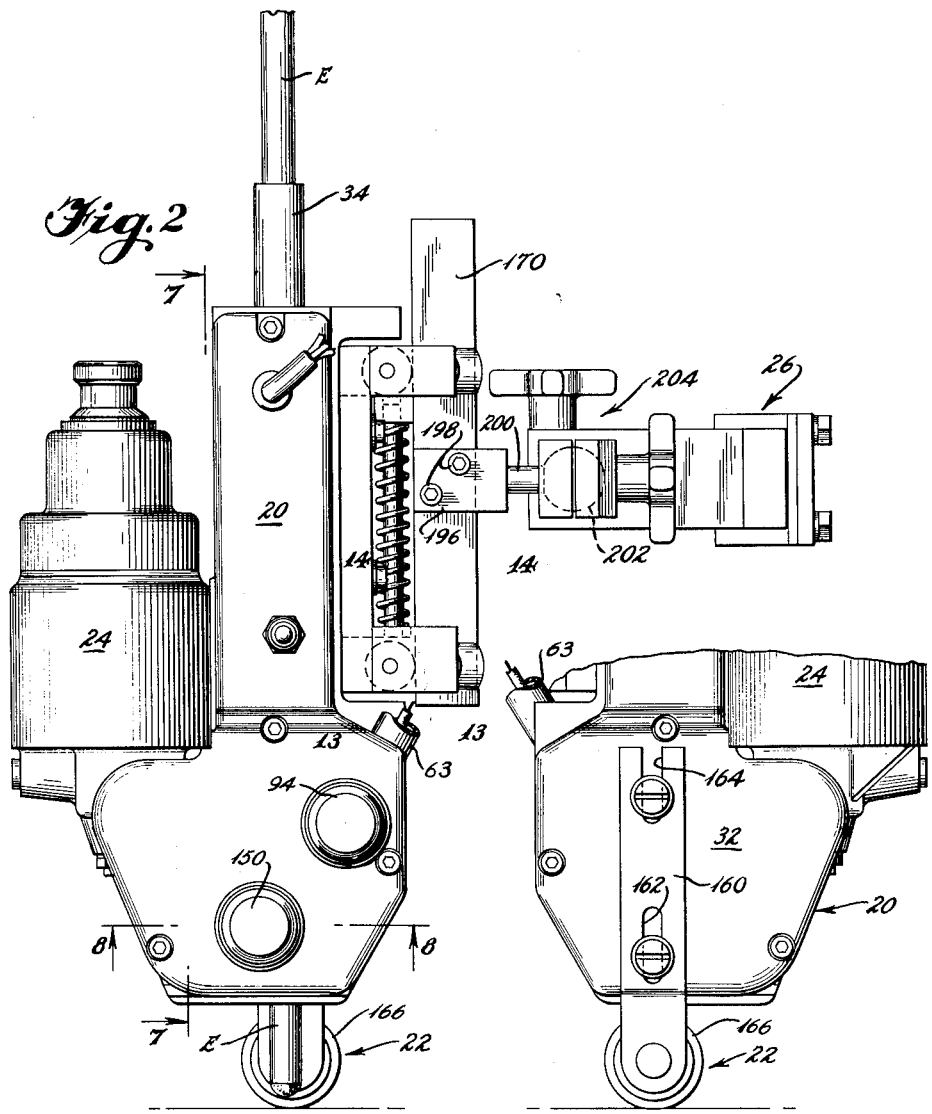

INVENTOR
Myron D. Stepath

June 20, 1961 M. D. STEPATH 2,989,617
CUTTING AND GOUGING TORCH HEAD
Filed May 11, 1959 5 Sheets-Sheet 4
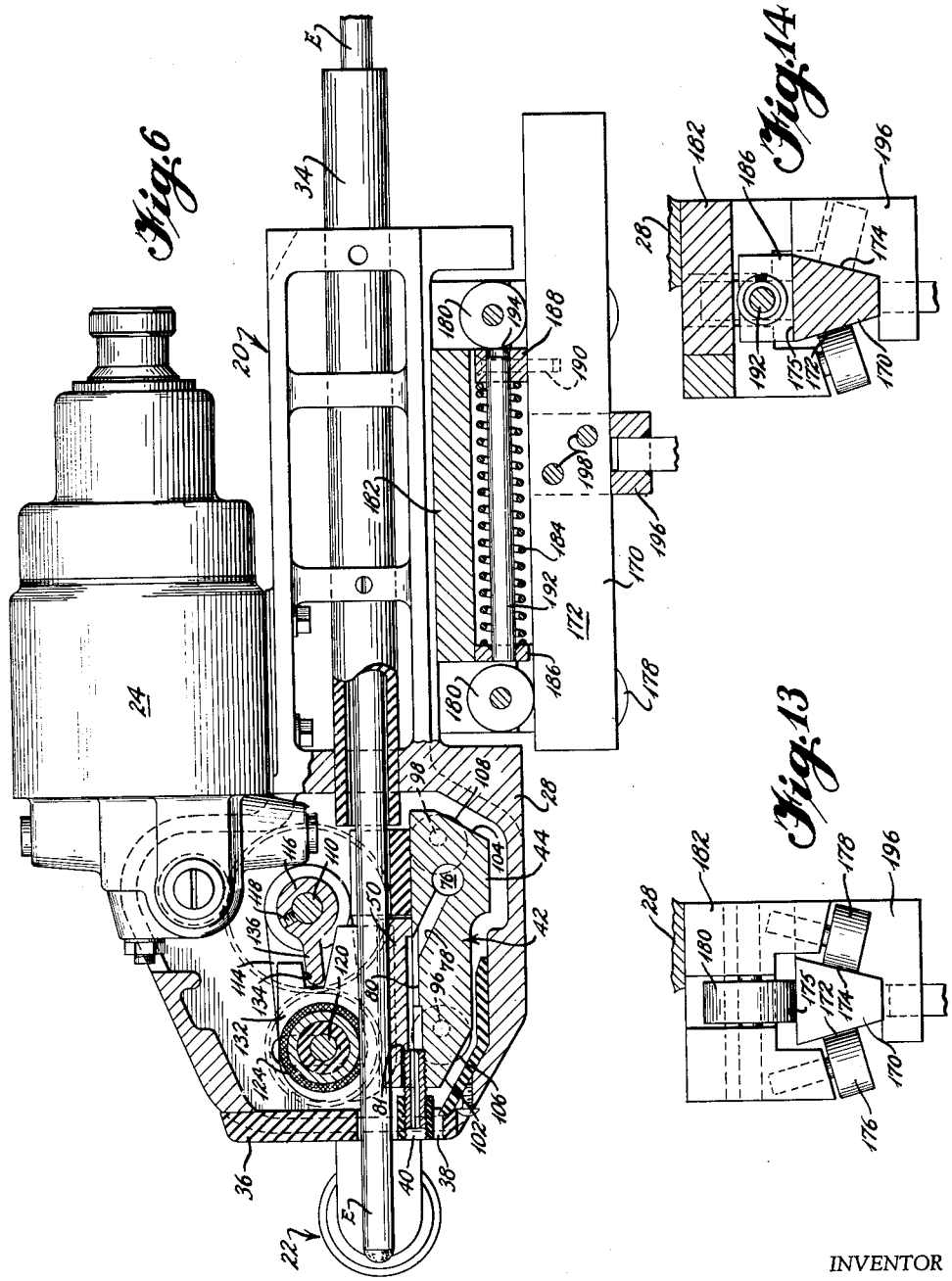
INVENTOR
*Myron D. Stepath*
BY
*Mead, Browne, Schuyler & Beveridge*
ATTORNEYS

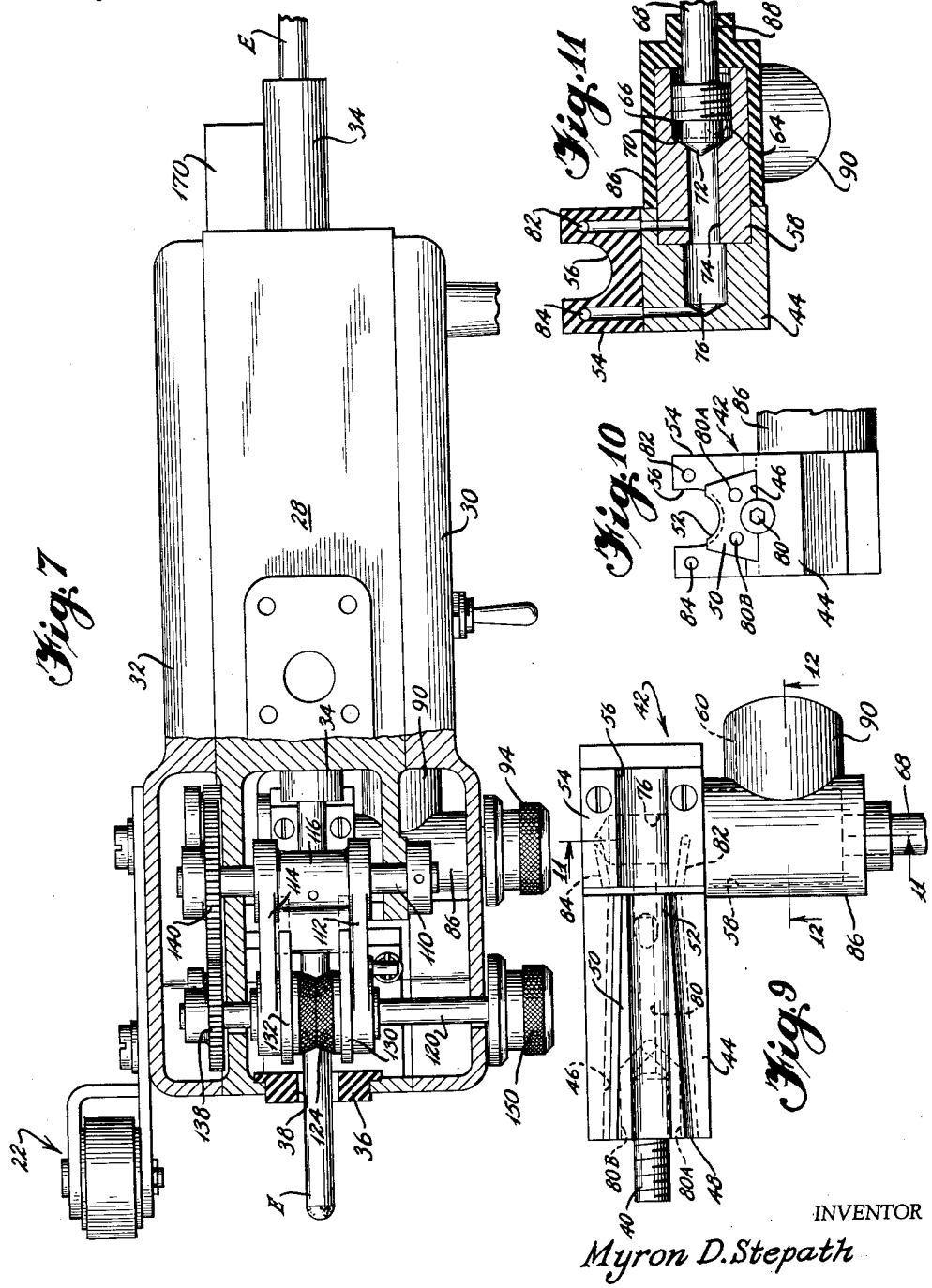

United States Patent Office  2,989,617
Patented June 20, 1961

2,989,617
CUTTING AND GOUGING TORCH HEAD
Myron D. Stepath, Lancaster, Ohio, assignor to Arcair Company, Lancaster, Ohio, a partnership
Filed May 11, 1959, Ser. No. 812,406
12 Claims. (Cl. 219—69)

This invention relates to electric arc-gas jet cutting and gouging devices, and more particularly to a torch head especially adapted for automatic operation.

It is a primary object of the invention to provide an electric arc-gas jet cutting and gouging torch head in which a rigid electrode may be automatically fed toward a work material surface at an accurately controlled rate.

It is another object of the invention to provide an electric arc-gas jet cutting and gouging torch head in which the head is moved across the surface of the work and accurately maintained at a fixed distance from the work regardless of undulations of the work surface or unsteadiness of the moving mechanism.

It is another object of the invention to provide an electric arc-gas jet cutting and gouging torch head which is coupled to a mechanism for traversing the head across the surface of the work in which the head may shift relative to the work in a direction parallel to the direction in which the electrode is fed, regardless of the orientation of the head relative to the moving mechanism.

Still another object of the invention is to provide apparatus for positively feeding an electrode along a selected path at an accurately maintained rate of movement.

Still another object of the invention is to provide an electric arc-gas jet cutting and gouging device in which the final end of a consumed electrode is forcibly ejected from the electrode feeding apparatus.

The foregoing and other objects are achieved in a torch head structure in which an electrode seat is formed with an elongated concave electrode receiving and guiding groove. An electrode seated in the groove is driven in longitudinal feeding movement by a rotating electrode driving wheel which is supported for coaxial rotation with the planet gear of an epicyclic gear train. The relationship between the axes of the planet gear and the sun gear of the train and the path in which the electrode is fed is such that reaction forces developed by resistance of the electrode to feeding movement are transmitted to the planet gear in a fashion such that it is forced more firmly against the electrode by the reaction forces. The electrode seat is constructed with orifices through which gas jets are discharged to assist in the cutting and gouging operation and to cool that portion of the electrode as it passes over the seat. The cooling jets are directed in converging paths against opposite sides of the electrode, and when the final portion of the consumed electrode passes the cooling jets, the jets act to forcibly eject from the feeding assembly.

The structure described above is mounted in a head assembly which is in turn coupled to a traversing carriage which drives the head in movement across the surface of work material. A variable speed motor mounted on the head may be set to drive the electrode driving wheel at a rate selected in accordance with the rate at which the head is traversed across the work material. The head is coupled to the traversing carriage by structure which includes an elongate guide bar of uniform polygonal transverse cross-section. The guide bar is supported in the head by a plurality of guide rollers in such a fashion that the bar may reciprocate relative to the head in a direction parallel to the direction in which the electrode is fed. A ball and socket connection between the guide bar and the traversing carriage permits the guide bar to be oriented in various positions of angular adjustment relative to the carriage.

Other objects and advantages of the invention will become apparent by reference to the following specification taken in conjunction with the accompanying drawings.

Figure 12:
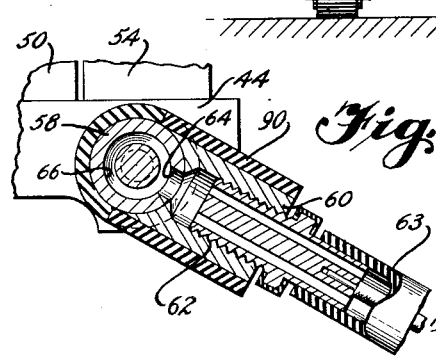
Figure 4:
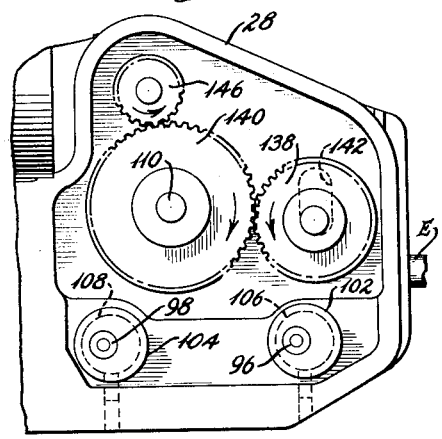
Figure 5:
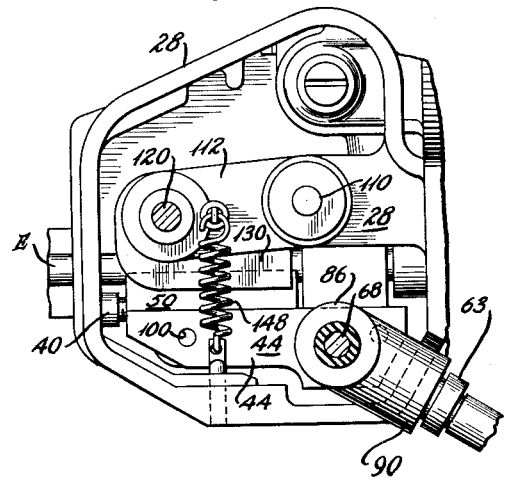
Figure 8:
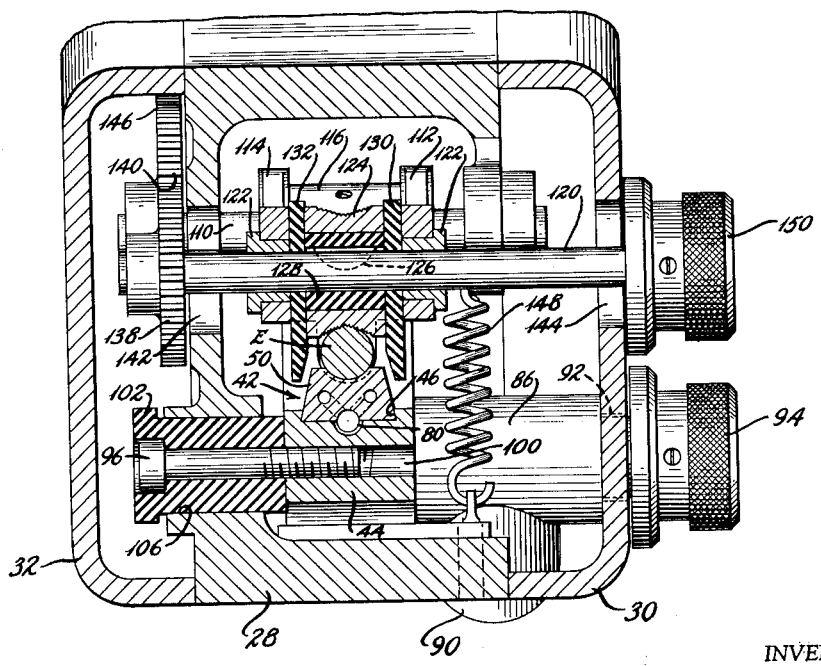

In the drawings:
FIG. 1 is a front elevational view of an electric arc-gas jet cutting and gouging assembly embodying the present invention with certain structure shown in phantom line;
FIG. 2 is a side elevational view of the assembly of FIG. 1;
FIG. 3 is a fragmentary side elevational view of the assembly of FIG. 1 taken from the side opposite that of FIG. 2;
FIG. 4 is a fragmentary view of one side of the head structure with certain parts removed and others omitted for the sake of clarity;
FIG. 5 is a view similar to FIG. 4 taken from the opposite side of the head;
FIG. 6 is a detail side elevational view similar ot FIG. 2 with certain parts removed or omitted and others shown in section;
FIG. 7 is a front elevational view of the assembly with certain parts removed and other parts shown in section;
FIG. 8 is a cross-sectional view of the head taken on the line 8—8 of FIG. 2;
FIG. 9 is a detail plan view of the electrode seat structure employed in the assembly of FIG. 1;
FIG. 10 is a front elevational view of the seat structure of FIG. 9;
FIG. 11 is a cross-sectional view of the seat structure taken on the line 11—11 of FIG. 9;
FIG. 12 is a partial cross-sectional view of the seat structure taken on the line 12—12 of FIG. 9;
FIG. 13 is a detail cross-sectional view of the guide bar and roller assembly taken on the line 13—13 of FIG. 2; and
FIG. 14 is a cross-sectional view of the guide bar and roller assembly taken on the line 14—14 of FIG. 2.

Referring first to FIGS. 1 through 3, an electric arc-gas jet cutting and gouging assembly embodying the invention is shown as including a head assembly designated generally 20 which is supported upon the surface of a piece of work material W by a depending roller designated generally 22. A rigid carbon electrode E is received within head 20 and fed in movement toward work material W by structure to be described in greater detail below. The electrode feeding structure includes a conventional variable speed motor 24 mounted upon head assembly 20.

Head assembly 20 is driven in movement across the surface of work material W at a selected rate of speed by traversing carriage indicated in phantom line in FIG. 1 at 26. As will be brought out by the following description, the details of carriage 26 are not particularly critical to the present invention. For purposes of illustration, it may be conveniently assumed that carriage 26 is supported from and driven in movement along suitably located tracks (not shown) which are parallel to the general plane of the surface of work material W. Generally, carriage 26 is reciprocated along a horizontal path—i.e., from left to right or vice versa in FIG. 2 and work material W will be suitably supported so that the surface which is to be operated upon by the cutting and gouging device lies in a plane generally parallel to the plane of movement of carriage 26.

Referring now to FIGS. 6 through 8, head assembly 20 includes a main head frame 28 having a generally open interior which is enclosed as by cover plates 30 and 32. The lower end of the head assembly is enlarged to form a housing for mechanism employed in feeding the electrode E while the upper portion of the housing is extended to support an elongate electrode feed tube 34 in the form of an open ended hollow tube of electrical insulating material. As best seen in FIG. 6, the lower end of tube 34 terminates at the upper portion of the enlarged chamber formed in the lower end of the head. The lower end of the enlarged chamber is closed by a plate 36 of electrical insulating material having an opening 38 through which electrode E is fed and through which gas under pressure is discharged from a nozzle 40.

The path in which electrode E is fed through head 20 is determined by an electrode seat assembly 42.

Electrode seat 42 includes a main body 44 of an electrically conductive material formed with a dovetail slot 46 the side walls of which, FIG. 9, converge rearwardly from the front end 48 of body 44. An electrode seat 50 is secured to main body 44 by a force fit within dovetail slot 46. The upper surface (FIG. 10) of seat 50 is formed with an elongate concave groove 52 which extends the entire length of seat 50 from front to rear and is shaped to receive and guide the electrode E in movement. A block of insulating material 54 is mounted upon the main body member 44 rearwardly of seat 50 and formed with a groove 56 to provide clearance for the electrode E.

Near the rear end of main body portion 44, a tubular member 58 of electrically conductive material is fixedly secured to main body 44 to project outwardly from one side of the body. At the outer end of member 58, a second tubular member 60 of electrically conductive material projects at right angles from member 58. As best seen in FIG. 12, an internally threaded bore 62 extends inwardly into member 60 to permit a supply conduit 63 to be connected to electrode seat assembly 44.

Both electric current for electrode E and gas under pressure are supplied to seat assembly 42 by conduit 63. Since supply conduits of this type form no part of the present invention, the supply conduit has not been illustrated in detail, but may take the form of the conduit disclosed and described in Stepath et al. Patent No. 2,706,236 granted on April 12, 1955.

As best seen in FIG. 12, a radially extending bore 64 extends through the wall of member 58 to place tapped bore 62 in fluid communication with an internal chamber 66 in member 58. A valve stem 68 is threadably received within chamber 66 and the inner end of chamber 66 is formed with a conical seat 70 against which a complementary head 72 on stem 68 may seat to block communication between chamber 66 and a passage 74 which extends axially through member 58 and opens into a chamber 76 within main body 44. By rotating stem 68, head 72 may be retracted from seat 70 to place passage 74 in communication with chamber 66. An inclined bore 78 extends from chamber 76 to a main passage 80 which is formed by mating grooves of hemispherical cross-section in the engaged faces of main body 44 and seat 50. At the front end of body 44, nozzle 40 is threaded into a tapped half bore formed in body 44 to form a continuation of passage 80 outwardly beyond the forward end of body 44. Nozzle 40 engages a shoulder 81 on seat 50 to lock seat 50 against forward movement in slot 46. Nozzle 40 may also be employed to drive seat 50 into snug engagement within slot 46. In addition to main passage 80, a pair of branch passages 80A and 80B respectively communicate with main passage 80 and open at the front end of seat 50. Gas discharged from each of the passages 80, 80A and 80B is discharged in jets substantially parallel to the sides of an electrode seated in the groove 52 of seat 50.

Gas under pressure is also discharged from passages 82 and 84 which are respectively connected into bore 74 and chamber 76 (FIG. 11). Passages 82 and 84 open from the forward face of block 54 to direct converging jets which impinge on opposite sides of an electrode seated in groove 52 to normally cool the electrode. When the final end of a consumed electrode passes beyond the feeding mechanism, the jets from passages 82 and 84 forcibly eject the end of the electrode clear of the head to prevent arcing between the work and the head.

Since the metallic parts of seat assembly 42 all carry the electrode current, those portions of seat assembly 42 located adjacent metallic members of the head frame are covered with electrically insulating material, member 58 being substantially enclosed by a sheath 86 which is bored as at 88 to form a bearing for rotary valve stem 68 while member 60 is surrounded by a tubular sheath of insulating material 90. As best seen in FIG. 8, the projecting outer portion of sheath 86 is received within a bore 92 in cover plate 30. The projecting metallic valve stem 68 is concealed within a knob 94 which is likewise constructed of electrically insulating material. Bore 92 is constructed to provide a limited amount of clearance to permit adjustment of seat assembly 42 relative to the frame of head assembly 20.

Seat assembly 42 is supported from main frame 28 by a pair of bolts 96, 98 which are threaded into tapped bores such as 100 (FIG. 8) in main body 44. Bolts 96 are eccentrically supported within bushings 102 and 104 of electrical insulating material which in turn are rotatably received within bores 106 and 108 in main frame 28. By independently rotating bushings 102 and 104, seat assembly 42 may be adjustably located with respect to the fixed frame elements for purposes which will be described more fully below.

The structure for driving the electrode E longitudinally along groove 52 includes a shaft 110 which is journaled within bores in main frame 28 at locations such that the longitudinal axis of shaft 110 extends in a direction normal to the electrode path of movement established by groove 52. A pair of parallel links 112 and 114 are interconnected to each other by a central hub 116 which is fixed, as by a set screw 118, to shaft 110. At the outer end of links 112 and 114, a second shaft 120 is journaled within link 112 as by bushings 122 for rotation about a second axis parallel to the axis of shaft 110. An electrode drive wheel 124 is rotatively coupled to shaft 120 for rotation with the shaft as by a key 126 and is electrically insulated from shaft 120 by a collar 128 of electrical insulating material. Wheel 124 is electrically insulated from links 112 and 114 by a pair of shielding plates 130 and 132 which project downwardly below wheel 124 to overlap the sides of an electrode received in groove 52. As best seen in FIG. 6, each of plates 130 and 132 is formed with a slot 134 in its rearward edge which receives a tongue or flange 136 formed on hub 116 of the link assembly. Tongue 136 prevents insulating plates 130 and 132 from rotating with wheel 124.

A gear 138 is rotatively fixed at one end of shaft 120 and meshes with a second gear 140 which is rotatably supported upon shaft 110. Gears 140 and 138 form an epicyclic gear train in which gear 140 is the sun gear and gear 138 is the planet gear. Gear 138 may partake of limited planetary rotation about the axis of shaft 110 since opening 142 in main frame 128 and opening 144 in cover plate 30 through which shaft 120 projects are elongated in the fashion best shown in FIGS. 4 and 8. Gear 140 is driven in rotation by gear 146 which in turn is driven from variable speed drive motor 24 through a suitable gear reduction assembly (not shown).

As best shown in FIG. 5, a tension spring 148 is connected between link 112 and main frame 28 to resiliently bias electrode drive wheel 124 toward groove 52 on the electrode seat assembly.

Wheel 124 is driven in a clockwise direction as viewed in FIG. 6 to drive electrode E outwardly through opening 38 in the plate 36. Spring 148 resiliently biases wheel 124 against electrode E. Since the axis about which wheel 124 rotates is closer to the electrode than is the axis of shaft 110, any reaction force developed by resistance of the electrode E to movement as wheel 124 is rotated in a clockwise direction tends to urge wheel 124 more firmly into engagement with the electrode. This is because the line of action of a force through the axis of shaft 120 parallel to the direction of electrode feed and directed toward the right in FIG. 6 passes between the axis of shaft 110 and the electrode, thus tending to force links 112 and 114 in a counterclockwise direction about the axis of shaft 110. Because of this reaction force, drive wheel 124 is forced against electrode E and bites into the electrode during operation to assure a positive feeding movement of the electrode at a rate selected by adjusting the speed of variable speed motor 24. A knob 150 of electrical insulating material is mounted on the projecting end of shaft 120 to permit manual rotation of shaft 120 to initially set the distance between electrode E and the work to pivot wheel 124 away from seat 42 to permit the insertion of a new electrode.

In normal use, the rate at which the electrode E is to be fed is set, by adjusting motor 24, in accordance with the speed at which carriage 26 traverses the work, the characteristics of work material W and the depth of cut or gouge desired. Since this setting is not susceptible to variation during the actual cutting or gouging operation, it is highly desirable that head 20 be maintained at a constant distance to the surface of work material upon which the cutting or gouging operation is to be performed. In the usual case, carriage 26 is supported independently from the work material although the work material will be located at some known location relative to the path of travel of the carriage. Since material upon which the cutting or gouging operation is to be performed frequently is not perfectly flat or smooth, undulations in the surface of the material would normally destroy the fixed relationship between the head and surface of the work material if the head were fixedly mounted upon the carriage.

To maintain the head assembly 20 a constant distance above the surface of work material W, regardless of undulations of the surface of the work material, head assembly 20 is constructed with a work material engaging roller assembly 22 and is attached to carriage 26 by structure to be described below which permits head assembly 20 to reciprocate in a vertical direction to carriage 26 or more properly permits head 26 to move relative to carriage 26 along a path parallel to the path in which electrode E is fed.

As best seen in FIG. 3, roller assembly 22 includes a strut 160 formed with elongated openings 162 and 164 so that roller 166 may be clamped to cover plate 32 at adjusted positions longitudinally along the path of electrode feed to establish a selected distance between the surface of work material W and the lower end of head assembly 20. As best seen in FIG. 2, roller 166 is supported so that its point of engagement with work material W is substantially in alignment with electrode E.

The structure by which head assembly 20 is coupled to carriage 26 includes an elongate guide bar 170 of uniform polygonal transverse cross-section. Preferably, the cross-sectional configuration of bar 170 is of a keystone cross-section having a pair of opposed sides 172 and 174 transversely convergent in a direction away from intermediate side 175. Bar 170 is supported upon main frame 28 for reciprocatory movement parallel to the path in which electrode E is fed by two sets of guide rollers which engage bar 170 at longitudinally spaced locations. Each set of guide rollers is similar, the lowermost set is shown most clearly in FIG. 13. Each set of guide rollers includes three rollers 176, 178 and 180 rotatively journaled or supported in a bracket 182 which is fixedly secured to main frame 28 by any suitable means such as bolts, not shown. Rollers 176, 178 and 180 are supported for rotation about axes which are respectively parallel to sides 172, 174 and 175. When bar 170 is received between the two sets of rollers, the bar is positively held against all movement relative to head 20 except movement in a direction parallel to the direction of electrode feed. A compression spring 184 acts between a seat 186 fixed to bracket 182 and a stop lug 188 which is fixed to guide bar 170 as by a bolt 190. Preferably, a guide rod 192 is fixedly mounted in seat 186 and extends through the coils of springs 184 to be slideably received within a bore 194 in stop 188. Spring 184 normally biases bar 170 to the position shown in FIG. 6 at which stop 188 is in engagement with the roller 180 of the uppermost set of rollers.

A bracket 196 is fixedly secured to guide bar 170 as by bolts 198 and projects transversely from the bar away from head 20. A rod 200 projects from the outer end of bracket 196 and a ball 202 at the outer end of bar 200 is received within a complementary clamping socket assembly 204 which in turn is fixedly secured to carriage 26.

In the usual case, it is desirable to have electrode E fed in a direction perpendicular to the surface of work material W. However, the universal connection afforded by the ball and socket assembly 202 and 204 permits head assembly 20 to be angularly adjusted with respect to carriage 26 either to achieve a precise perpendicular relationship between the electrode and work or to permit head 20 to be inclined with respect to the direction of carriage travel. Since the coupling assembly permits bar 170 to be angularly adjusted with respect to the carriage, head 20 is always free to reciprocate relative to the carriage along a path which is parallel to the path in which the electrode is fed because of the parallel relationship between guide bar 170 and the electrode feeding path.

While I have disclosed but one embodiment of my invention it will be apparent to those skilled in the art that the disclosed embodiment may be modified. Therefore, the foregoing description is to be considered exemplary rather than limiting, and the true scope of my invention is that defined in the following claims.

I claim:
1. An electric arc-gas jet cutting and gouging assembly comprising a head frame, means on said head frame for longitudinally feeding an elongated electrode at a selected rate along a path extending through one end of said head frame, roller means mounted on said head frame and projecting beyond said one end of said frame to establish and maintain a selected distance between said one end of said frame and a piece of work material engaged by said roller means, an elongated guide bar of uniform polygonal transverse cross-section, guide roller means mounted in said head frame for rolling engagement with at least three sides of said bar at longitudinally spaced locations thereon to define a path of reciprocatory movement of said bar relative to said head frame parallel to the path along which the electrode is fed, carriage means for moving said head frame across a piece of work material at a selected rate, and means for securing said guide bar to said carriage means.

2. An assembly as defined in claim 1 wherein said means for securing said guide bar to said carriage means includes means for locking said guide bar to said carriage means at selected positions of angular adjustment relative to said carriage means.

3. An assembly as defined in claim 1 wherein said guide bar includes a first longitudinally extending side, and a pair of opposed sides transversely convergent toward each other in a direction away from said first side, said guide roller means including two sets of three guide rollers each engaging said bar at longitudinally spaced positions, one roller of each set being in rolling engagement with said one side and the other two rollers of each set being respectively in rolling engagement with said opposed sides.

4. Apparatus for longitudinally feeding an elongated electrode comprising a frame, an electrode driving wheel rotatable about a first axis, means supporting said wheel in said frame for pivotal movement about a fixed second axis located in spaced parallel relationship to said first axis, an electrode seat mounted in said frame and having an elongated groove therein for receiving and guiding an electrode in movement along a path normal to said first axis and inclined in a direction from one of said first and second axes toward the other of said axes, means for locating said wheel in engagement with an electrode received in said groove, and means for driving said wheel in a direction to advance said electrode along said groove in the direction of inclination of said path.

5. Apparatus for longitudinally feeding an elongated electrode comprising a frame, an electrode driving wheel rotatable about a first axis, means supporting said wheel in said frame for pivotal movement about a fixed second axis located in spaced parallel relationship to said first axis, an electrode seat having an elongated groove therein extending in a direction normal to said first axis for receiving and guiding an electrode, means for adjustably positioning said seat within said frame to incline said groove in a direction from one axis toward the other axis, resilient means coupled to said support means for biasing said wheel about said second axis toward said seat to resiliently clamp an electrode received in said groove between said seat and said wheel, and means for driving said wheel to advance said electrode along said groove in the aforementioned direction of inclination.

6. Apparatus for longitudinally feeding an elongated electrode comprising a frame, an electrode seat mounted in said frame and having an elongate groove therein defining a path of movement of an electrode received in said groove, an epicyclic gear train mounted in said frame and including a sun gear mounted for rotation about a fixed first axis normal to said path and spaced a first distance therefrom and a planet gear rotatable about a second axis parallel to said first axis, an electrode driving wheel coupled to said planet gear for coaxial rotation therewith, said wheel being engageable with an electrode received in said groove to locate said second axis at a distance from said groove less than said first distance, and means for driving said gear train to rotate said wheel in a direction driving said electrode along said groove successively past said first axis and said second axis.

7. Apparatus as defined in claim 6 including means for adjusting said seat relative to said frame in directions normal to said first axis.

8. An electric arc-gas jet cutting and gouging torch head comprising a frame, an electrode seat mounted in said frame and having an elongate electrode receiving and guiding groove therein extending rearwardly from the forward end of said seat, means in said frame engageable with an electrode received in said groove for driving the electrode forwardly along said groove, first means in said seat for discharging gas in jets directed forwardly from the front end of said seat along the sides of an electrode received in said groove and projecting forwardly from said seat, and second means located adjacent the rear end of said seat for discharging gas in a plurality of forwardly convergent jets along opposed sides of an electrode seated in said groove.

9. In an electric arc-gas jet cutting and gouging apparatus; an electrode seat assembly comprising a main body member having a dovetail slot in the upper surface thereof, an electrode seat member having a lower portion complementary in shape to said slot and received therein, at least one of said members having a groove therein defining a fluid passage extending rearwardly from the front of said main body member along the bottom wall of said slot, and a nozzle threadably received in said main body member at the front end of said passage in fluid communication with said passage.

10. In an electric arc-gas jet cutting and gouging apparatus; an electrode seat assembly comprising a main body member having a dovetail slot in the upper surface thereof, an electrode seat member having a lower portion complementary in shape to said slot and received therein, at least one of said members having a groove therein defining a fluid passage extending rearwardly from the front of said main body member along the bottom wall of said slot, a nozzle threadably received in said main body member at the front end of said passage in fluid communication with said passage, and a forwardly facing shoulder on said seat member engaged with said nozzle to prevent movement of said seat forwardly within said slot.

11. In an electric arc-gas jet cutting and gouging apparatus; an electrode seat assembly comprising a main body member having a rearwardly convergent dovetail slot in the upper surface thereof and a first fluid passage extending downwardly through said body member from the bottom wall of said slot, an electrode seat member having a lower portion complementary in shape to said slot and received within said slot, at least one of said members having a groove therein defining a second fluid passage extending rearwardly from the front of said main body member along the bottom wall of said slot to communicate with said first fluid passage, and a nozzle threadably received in the front of said main body in fluid communication with said second fluid passage.

12. In an electric arc-gas jet cutting and gouging apparatus; an electrode seat assembly comprising a main body member having a rearwardly convergent dovetail slot in the upper surface thereof and a first fluid passage extending downwardly through said body member from the bottom wall of said slot, an electrode seat member having a lower portion complementary in shape to said slot and received within said slot, at least one of said members having a groove therein defining a second fluid passage extending rearwardly from the front of said main body member along the bottom wall of said slot to communicate with said first fluid passage, said seat having a groove therein extending rearwardly from its front end in alignment with said second fluid passage and terminating within said seat at a forwardly facing shoulder, and a nozzle threadably received within the front of said main body member in fluid communication with said second passage and having an inner end abutting said shoulder on said seat.

References Cited in the file of this patent

UNITED STATES PATENTS

| | | |
|---|---|---|
| 1,746,208 | Alexander | Feb. 4, 1930 |
| 2,085,808 | Krause | July 6, 1937 |
| 2,723,331 | Tyrner | Nov. 8, 1955 |
| 2,903,554 | Stepath | Sept. 8, 1959 |